Patented Mar. 14, 1939

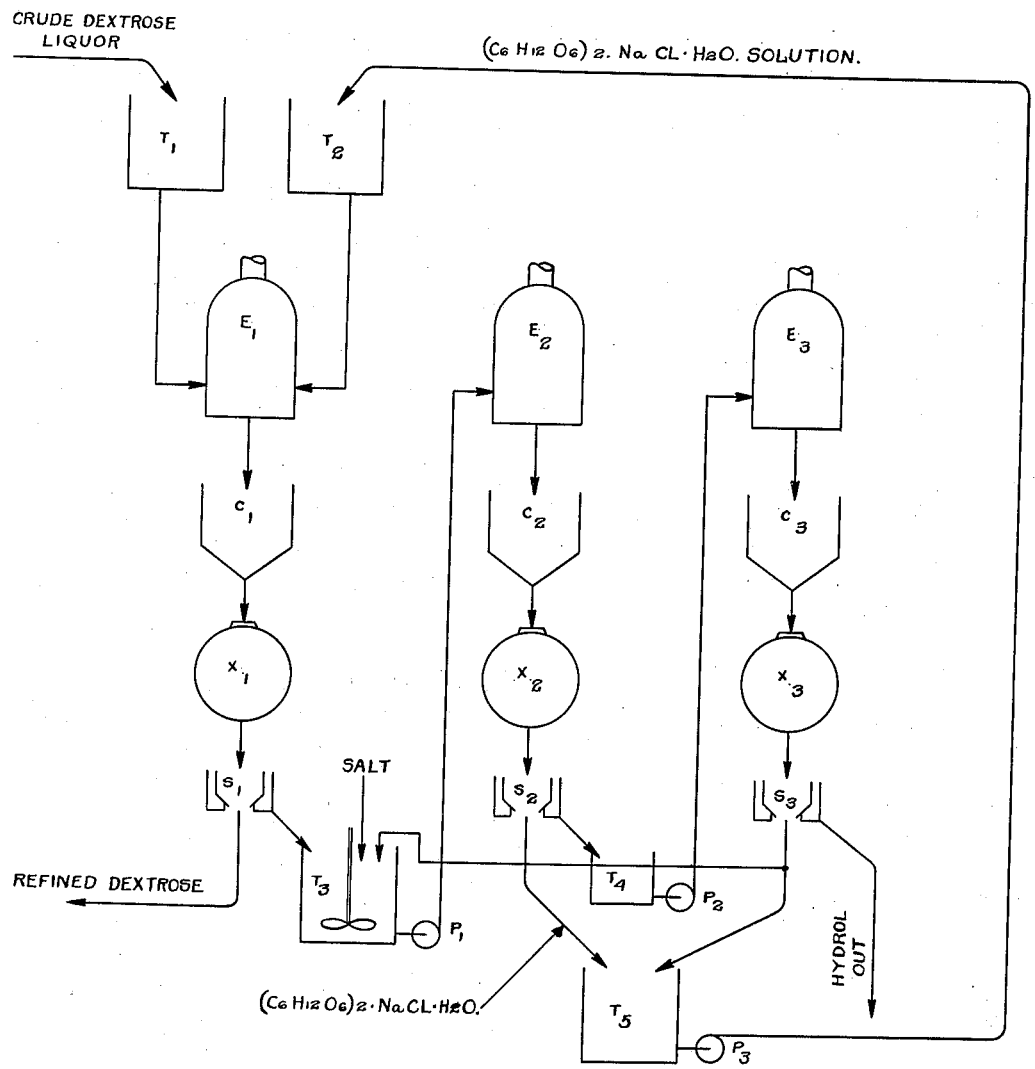

2,150,146

UNITED STATES PATENT OFFICE 2,150,146

MANUFACTURE OF DEXTROSE

Thomas Harvie Barnard and Paul L. Stern, Clinton, Iowa, assignors to Clinton Company, Clinton, Iowa, a corporation of Iowa Application October 20, 1934, Serial No. 749,146
Renewed August 8, 1938

12 Claims. (Cl. 127—46)

This invention relates to the recovery of dextrose from impure solutions containing dextrose, such as solutions obtained from the hydrolytic conversion of starch, corn sugar molasses (hydrol) resulting from the separation of crystallized dextrose from solutions containing the latter, and any and all other dextrose containing liquors no matter whether obtained originally or as intermediate products. It is contemplated that this invention may be utilized in obtaining dextrose from acid and/or enzyme converted starchy and/or carbohydrate material of grains such as rice, wheat, oats, rye, barley, corn or roots such as arrowroot, sago, cassava or tubers such as both white and sweet potatoes, or fruits, vegetables or woody substances capable of yielding dextrose upon hydrolysis, conversion, inversion and/or upon solution in water.

The invention is especially useful in the commercial production of dextrose, commonly referred to as corn sugar, from the concentrated syrup of converted corn starch. According to the usual practice in the industry today, the corn starch is converted until there is produced a solution containing about 87% of dextrose (dry basis). After the usual clarifying procedure, this solution is concentrated in vacuum pans to such a density as will induce crystallization of the dextrose, either in hydrous or anhydrous form as desired. This invention is concerned with the recovery of dextrose from such starch converted liquors. After the dextrose has been crystallized and removed from the mother liquor by centrifugal separation usually, the filtrate or hydrol remaining contains a large proportion of reducing substances principally dextrose, which is exceedingly difficult to recover from the hydrol. After the removal of the crystals obtained from the first crystallization of dextrose from an original starch converted sugar liquor, this hydrol may contain as much as 70% by weight of the dextrose which was present in the original sugar liquor. Even after repeated crystallizations the hydrol may yet contain sufficient dextrose in solution to make further recovery desirable.

By means of processes followed in accordance with the present invention as high as 60% of the total dextrose may be recovered economically from the hydrol resulting from the first crystallization in a single crystallization and by employing further crystallization on the same syrup additional increments of dextrose may be recovered until as much as 80% or more of the original dextrose content of the sugar liquor may be recovered.

The primary object of the invention, therefore, is to provide a process for the recovery of dextrose from impure dextrose containing liquors which will yield economically a greater recovery of the dextrose from such liquors than has heretofore been customary.

Various other objects and advantages of the invention will be set forth hereinafter.

The invention may be best illustrated by describing its application to the recovery of dextrose from the well known dextrose containing liquids which are produced by converting corn starch by means of heat and acid into dextrose and other starch conversion products, as is done for the purpose of producing refined corn sugar, corn syrup, etc. The attached drawing illustrates diagrammatically the preferred form of the process as applied to the corn starch conversion liquors.

Reference may be had to the United States Letters Patent No. 1,886,941 of George E. Corson and Arthur P. Bryant, issued November 28, 1932, for a general understanding of the starch conversion liquors referred to herein.

In our invention herein described advantage is taken of the well known fact that dextrose forms double salts with several halogen salts. One of these double salts, dextrose sodium chloride, having the formula $(C_6H_{12}O_6)_2.NaCl.H_2O$ is obtained by allowing a mixture of concentrated solutions of two mols of dextrose and one mol of sodium chloride to crystallize together as was disclosed by V. Lippman in "Die Zuckerarten and Ihre Derivate," 1882, pp. 44–45. See also the discussion by Shinnosuke Matsuura in the Bulletin of the Chemical Society of Japan, 2, 44 (1927) in an article entitled "Equilibrium of the System: Dextrose-Sodium Chloride-Water". As can be seen from the above formula 58.5 parts by weight of sodium chloride would combine with 360 parts by weight of dextrose, making the ratio of 16.2 parts of sodium chloride to each 100 parts of dextrose.

Accordingly the hydrol and washings resulting from centrifugal separation of crystallized dextrose made in accordance with the process of the above noted patent will have its reducing sugars content determined by analysis. It is known that practically the whole amount of reducing sugars present in the hydrol is dextrose, hence for convenience in practical operation it will be assumed that analysis with Fehling's solution gives the dextrose content, and the proportion of sodium chloride to be added will be determined with reference to the total reducing sugars present. The hydrol also should first be analyzed for the purpose of ascertaining the amount of sodium chloride present resulting from the prior neutralization of hydrochloric acid by sodium carbonate and thereafter enough sodium chloride will be added to the hydrol and washings to increase the NaCl content approximately to the ratio of 16 parts of NaCl to 100 parts of reducing sugars calculated as dextrose. The solution should be sufficiently agitated to insure complete dissolving of the salt. This will be done preferably in the tank T3 shown in the diagram wherein the hydrol and washings are collected at the time the crystallized dextrose is centrifugally separated.

The hydrol containing the required amount of salt added in the tank T3 will be delivered by the pump P1 into the evaporator E2 which will preferably be a vacuum pan such as is customarily used in the corn sugar refining industry. In the evaporator the solution will be evaporated to about 42° to 46° Bé. measured at 100° F., preferably, to about 44° Bé.

The concentrated solution will then be discharged from E2 into the cooler C2 where it is quickly cooled to a temperature range of 130° to 100° F. A 44° Bé. solution should be cooled to about 120° F.

The cooled solution will then be discharged into a crystallizer X2 provided with agitators and in which there will preferably, but not necessarily, remain some crystals of dextrose sodium chloride from a previous batch and which may be used advantageously as seed. During the period of crystallization a certain amount of periodical or intermittent agitation will aid in thoroughly dispersing the seed and preventing the growth of large masses of crystals which might interfere with proper crystal growth. In the meantime cooling water may be circulated through the jacket of the crystallizer to further reduce the temperature of the magma gradually to about 80° F. The temperature range at this stage is not critical.

When crystallization has been completed the magma will be discharged into the centrifugal or spinner S2 and the crystal cake formed therein will consist of the double salt, dextrose sodium chloride, as above described, but in an impure state due to adhering mother liquor. Should it be desired for any reason to obtain at this point a pure dextrose sodium chloride the cake will be thoroughly washed in accordance with the usual practice to free it of the adhering mother liquor. However, in the preferred manner of conducting this process a pure dextrose sodium chloride is not needed and it is desirable to avoid the accumulation of wash water. Hence the cake may be discharged without washing directly into the tank T5 and the hydrol resulting during the spinning will be discharged into the tank T4.

The liquor in the tank T4 should be analyzed to ascertain the ratio of salt to reducing sugars and, if necessary, salt may be added to attain the theoretical proportions required for producing in a subsequent crystallization of this liquor the desired dextrose sodium chloride. The liquor in the tank T4 is then delivered by means of a pump P2 into the evaporator E3 which also will be preferably the usual vacuum pan. Here the solution is concentrated under vacuum to a density ranging from 42° to 46° Bé. measured at 100° F. but preferably 44° Bé. After concentration it will then be discharged through the cooler C3 and cooled to 130° to 100° F. and discharged into the crystallizer X3 where a crystallizing procedure is then followed similar to that described for the crystallizer X2.

When crystallization in X3 has satisfactorily progressed the magma is discharged into the centrifugal S3 and the cake resulting from the spinning may be discharged with or without washing into the tank T3 to be returned again through the dextrose sodium chloride crystallizers, or it may be washed and discharged into the tank T5. If the cake is washed the wash water may be delivered to the tank T4. The hydrol discharged from the centrifugal S3 may be recrystallized, if it should be economical to do so, or, if it is desirable for any reason, it may be at this point taken out of the process. If it is found economical or desirable to recrystallize the hydrol from S3 it is obvious that the same procedure set forth in the last described cycle may be followed, such as adjustment of salt to dextrose ratio, etc.

The crystal cake obtained from the centrifugal S2, and perhaps from the centrifugal S3, will then be completely dissolved in water in the tank T5 and delivered by the pump P3 to the tank T2, from whence this dextrose sodium chloride solution may then be delivered, into the evaporator E1 along with the crude starch conversion liquor. Upon dissolving the dextrose sodium chloride in the water this double salt becomes dissociated into dextrose, sodium chloride and water.

The amount of the double salt added to the crude starch conversion liquor should not be in such an excessive proportion that upon subsequent evaporation of the combined solution anything except dextrose will crystallize from the solution. Should an excess of the double salt be added, there will be found along with the dextrose crystals separating from the solution some dextrose sodium chloride crystals, which are obviously undesirable. We have found that it is safe to add the double salt in any proportion not exceeding a weight (calculated on a dry basis) approximately equal to the weight of the dextrose in the starch conversion liquor, also calculated on a dry basis. Within these proportions only dextrose crystals will crystallize, which is the preferred result.

The mixture of the solution of dextrose sodium chloride and the original sugar liquor will then be concentrated in the evaporator E1 to a density ranging from 37° to 43° Bé. but preferably at about 40° Bé. The concentrated liquor will then be conducted into the cooler C1 and rapidly cooled down to a temperature range of 110° to 100° F. at which temperature range conditions are favorable for the crystallization of hydrous dextrose crystals in preference to the anhydrous dextrose crystals. The cooled concentrated liquor is then discharged into a crystallizer X1 provided with agitating means and the temperature therein further reduced gradually down to about 95° F. as the crystal growth proceeds. Slow continuous or intermittent agitation may be given to the crystallizing mass to prevent formation of large agglomerations of crystals such as might interfere with uniform crystallization of the large hydrate crystals that are desired. The use of dextrose crystals as seed in the crystallizer is recommended, the amount of seed to be used being a matter of individual judgment.

It will be found that crystallization of dextrose from this magma containing the salt is more rapid due to decreased viscosity of the magma. This decrease in viscosity is due in part to the effect of the salt and in part to an increase in the proportion of dextrose with reference to the total solids present, exclusive of the salt. The crystals produced are also more easily purgeable in the centrifugals because of lessened viscosity of the mother liquor.

When crystallization has proceeded far enough to produce a magma which will centrifuge efficiently the magma is conducted to the centrifugal separator S1 and there the crystallized dextrose is separated centrifugally from the hydrol. The dextrose thus produced will, after suitable washing in the centrifugal, be found to have a purity in excess of 99%, to be perfectly white and have a good luster. Substantially all of it will be of the hydrous form and may be dried and pulverized and prepared for the market as refined dextrose. A small amount of sodium chloride will be found mixed with the crystals but in amount less than .05%. It may be noted that this small amount of NaCl is about the same as is contained in the better grades of dextrose produced at the present time by other well known processes.

The hydrol and washings from the centrifugal S1 will be collected in the tank T3 and used throughout the process in the manner heretofore described. This hydrol should be analyzed for its dextrose and sodium chloride content, the latter, of course, being greater than would be found in a hydrol from a conversion liquor to which the double salt had not been added. Also the dextrose content will be determined and NaCl will be added in whatever amount is necessary to provide about 16 parts of NaCl to 100 parts of reducing sugars calculated as dextrose. Thereafter the cycle heretofore described for the crystallization of the double salt from the hydrol will be repeated and the crystallized double salt thus obtained will be used for addition to succeeding batches of crude dextrose liquor, as in the evaporator E1.

In the prior literature there will be found references recommending recrystallization of the usual hydrol (containing no added sodium chloride nor the double salt) for the purpose of obtaining a further yield of dextrose from the hydrol alone. Such processes require a relatively long time, for example, about seven days, for crystallizing because of the high impurity content and will yield on first crystallization of the hydrol only about one-third of the dextrose retained therein. A second crystallization requires an even longer crystallization period, oftentimes as much as twelve days being required. Again only about one-third of the remaining dextrose can be crystallized and separated.

According to this invention, however, by treating the hydrol collected in T3 with sodium chloride in the right proportions to induce crystallization of the double salt we find that we can, on first crystallization thereof, extract in the form of the double salt crystals about 50 to 60% of the dextrose then present, and the crystallizing period required therefor will be only about three days as contrasted to seven days when the double salt process is not used. The second crystallization of the hydrol collected in T4 to obtain the double salt will succeed in extracting again in the form of double salt crystals about 50% of the dextrose then present. The crystallizing period for this second recrystallizing is only about six days as contrasted with twelve days for a second crystallization of hydrol not employing sodium chloride. These figures are, of course, approximate figures. It should be understood that the results obtained in practice may vary somewhat from these figures due to such factors as the judgment and skill of the operators and the efficiency of the equipment.

Where the dextrose sodium chloride is added to the crude starch conversion liquor they may be mixed together while both are in dilute solution or the crude liquor may first be concentrated partly or wholly to its intended final density and the dextrose sodium chloride may be added thereto in a concentrated water solution or may be added in dry or damp crystalline form. In any event, complete solution of the dextrose sodium chloride in the liquor must be accomplished before crystallization of the dextrose begins. This is most conveniently done by having sufficient water present and the temperature of the liquor high, that is, usually about 150° to 160° F. The dextrose sodium chloride should be completely dissolved in and uniformly dispersed throughout the starch conversion liquor.

Likewise where NaCl is to be added to a hydrol with the intention that the solution of the two is later to be concentrated to induce crystallization of the double salt, the hydrol may be first separately evaporated toward or to its intended final density and the NaCl added thereto in a concentrated water solution or may be added dry. In any event, however, care must be taken to insure complete solution of the NaCl in the hydrol. If desired, the NaCl may be added to the hydrol while the latter is still dilute and the solution of the two then concentrated.

When salt is being added to the hydrol for the purpose of subsequently crystallizing therefrom dextrose sodium chloride alone, the proportions of about 16 parts of salt to 100 parts of the dextrose present should be followed. Should a lesser proportion of salt be added the result might be a crystallization of both the double salt and dextrose, or even dextrose alone, while an excessive amount of salt would produce a crystallization of the double salt plus sodium chloride or possibly only sodium chloride if it should be in a very great excess.

It may be desirable to control the process so that instead of producing only dextrose sodium chloride crystals from the hydrol, there will be produced a mixture of dextrose sodium chloride crystals and dextrose crystals. This may be done by adding less salt than the theoretical amount required for crystallizing only of dextrose sodium chloride. For example if 12 parts of salt to 100 parts of dextrose (dry basis) in the hydrol be mixed into the hydrol, or if the amount of salt added together with any salt already present totals about 12 parts of salt to 100 parts of dextrose, the crystals resulting upon subsequent concentration and crystallization will be a mixture of dextrose crystals and dextrose sodium chloride crystals. This mixture of crystals could be added to an original starch conversion liquor with quite satisfactory results.

As a modification in the process, the first hydrol from which dextrose sodium chloride is crystallized, instead of being obtained from an unsalted original starch conversion liquor, may be obtained from a starch conversion liquor to which sodium chloride may be added in any amount up to about 7% of the weight of the dextrose present in this impure dextrose solution. This addition of sodium chloride will be advantageous in that it will reduce viscosity of the liquor and improve the rate and character of the dextrose crystallization as well as facilitating the purging of the dextrose crystals in the centrifugals. When salt is thus added in the amount indicated, dextrose crystals only will be produced at the concentration and temperature conditions above noted for producing dextrose crystals from a mixture of dextrose sodium chloride and original impure liquor. The hydrol remaining after the removal of these dextrose crystals will of course contain all of the sodium chloride which was added. However this is not undesirable as further salt will then be added to the hydrol to the extent necessary to raise the salt proportion to about 16 parts sodium chloride to 100 parts dextrose (dry basis).

However, if it be desired, this salty hydrol without further addition of salt may be subjected to recrystallization to yield a mixture of dextrose crystals and dextrose sodium chloride crystals, all of which may be dissolved in a fresh batch of starch conversion liquor.

In the various steps of the process where crystallization of dextrose or other crystals is being attained, the practice followed will be that which is customary or normal in the industry at the present time. The temperature of the crystallizing mass will be maintained at that range which is most favorable, at the existing density, to a rapid and uniform growth of crystals of the type desired. The evaporation of the liquor in each case will have been carried to that point which will produce, in combination with the temperature thereafter maintained, a uniform and fairly rapid crystal growth. Ordinarily, slow continuous or intermittent agitation of the crystallizing mass will be employed to assume thorough distribution of seed, if any be used, and to prevent the forming of large masses of crystals which might impede uniform crystal growth. The principal object to be sought is to obtain eventually a mushy magma, not too stiff to be pumped or flowed by gravity through pipes into centrifugal separators, and yet allowing the crystallization to proceed far enough to procure as great a yield of crystals as is consistent with the ease of handling the magma and the ease and efficiency of centrifugally separating the crystals therefrom, and washing them free from adhering mother liquor. The proper length of the crystallizing period can be determined by examining the condition of the magma and through experience with the yield and centrifuging conditions. This period may vary from two or three days to six or seven days, but experience will teach when to stop the crystallization and centrifuge the magma.

"Seed" may or may not be used, it being well understood in this art that the crystal growth will proceed quite satisfactorily but more slowly if no seed is used, while seed, particularly seed consisting of crystals from a previous batch of the desired crystallized product, will induce more rapid and uniform crystallization and in some cases will give greater assurance that the crystals will run true to type. Ordinarily, seed weighing 5 to 10% of the weight of any new batch of crystallizable liquor will be sufficient, but more can be used if desired. The above described conditions relating to temperature control during crystallization, agitation, concentration, length of crystallizing, and the use of seed, are the normal conditions which are usually to be maintained and which will be maintained preferably in performing any crystallizing step in this process. Any reference hereinafter to normal crystallizing conditions refers therefore to the conditions just described and which are considered at the present time good practice.

Having shown and described our invention, we claim:

1. In the manufacture of dextrose from impure dextrose-containing liquors, the improvement involving the recovery of additional dextrose from a hydrol remaining from such liquors from which dextrose has been crystallized and removed, consisting in adding sodium chloride to said hydrol to yield dextrose sodium chloride upon subsequent crystallization and separation, separating the dextrose sodium chloride thus produced, and dissolving the same in another dextrose-containing liquor in proportions calculated to afford crystallization of dextrose only therefrom.

2. In the manufacture of crystallized dextrose from impure dextrose-containing liquors by concentrating and separating crystallized dextrose from the liquor, the improvement which consists in adding sodium chloride to the separated hydrol in amount sufficient to effect crystallization therefrom of dextrose sodium chloride upon subsequent evaporation and crystallization, crystallizing and separating said dextrose sodium chloride, mixing and dissolving the latter into a new batch of said impure liquor, crystallizing and separating from the last said batch dextrose crystals only, adding to the salty hydrol from the last dextrose crystallization sodium chloride in such proportions that dextrose sodium chloride will crystallize from the hydrol upon subsequent evaporation and crystallization thereof, and separating the crystallized dextrose sodium chloride thus produced.

3. A method of obtaining dextrose from an impure dextrose-containing liquor comprising dissolving dextrose sodium chloride in said liquor but not in such excess as to prevent crystallization of dextrose only therefrom, subsequently effecting crystallization and separation of the dextrose from said liquor, adding sodium chloride to the resulting hydrol proportioned to afford a yield of dextrose sodium chloride therefrom, effecting crystallization and separation of dextrose sodium chloride from said hydrol, and utilizing the crystallized double salt in solution with a new batch of said liquor for crystallizing dextrose therefrom.

4. A method of obtaining dextrose from an impure dextrose-containing liquor comprising dissolving dextrose sodium chloride in said liquor but not in amount exceeding the weight of the dextrose already present in said liquor, and subsequently effecting supersaturation of the resulting liquor and crystallization of the dextrose, and separating the latter from the liquor.

5. A method of obtaining dextrose from an impure dextrose-containing liquor comprising dissolving dextrose sodium chloride in water, adding the resulting solution to said liquor in a substantial amount but not to exceed 50 parts by weight on a dry substance basis of dextrose sodium chloride dissolved in water to 50 parts (same basis) of dextrose already present in the liquor, and subsequently effecting supersaturation of the resulting liquor and crystallizing the dextrose and separating it from the liquor.

6. In the manufacture of dextrose, a method comprising concentrating an original starch conversion liquor and crystallizing and removing therefrom pure dextrose, adding salt to the hydrol in such proportion that upon subsequent concentration and crystallization the hydrol will yield dextrose sodium chloride, separating said crystallized dextrose sodium chloride from the salted hydrol and adding the dextrose sodium chloride to fresh quantities of original starch conversion liquor in such proportions that by concentrating and subjecting the solution to crystallization a substantial yield of pure dextrose will result.

7. In the manufacture of dextrose, a method comprising adding sodium chloride to an impure starch conversion solution from which dextrose has previously been crystallized and removed and regulating the amount of salt added whereby concentration and crystallization of the solution will yield dextrose sodium chloride, separating from said solution the dextrose sodium chloride thus crystallized and adding the double salt to other impure dextrose containing solutions devoid of sodium chloride or at least having a considerably smaller percentage of sodium chloride than is present in the double salt, the amount of double salt added being in such proportion to the dextrose in the solution to which it is added that dextrose only will be the normal crystalline product which may be crystallized therefrom.

8. In the manufacture of dextrose, the improvement which consists in producing dextrose sodium chloride by adding to a solution containing dextrose and uncrystallizable starch conversion products such an amount of sodium chloride that upon suitable concentration of the solution dextrose sodium chloride will be crystallized, effecting said concentration and crystallization separating the double salt thus crystallized, recovering dextrose from said double salt by dissolving the latter in a water solution containing dextrose and uncrystallizable starch conversion products to effect dissociation in the water of sodium chloride and dextrose, the amount of double salt thus added being so limited that the ratio of dextrose to sodium chloride in the mixed solution remains in the range favorable to crystallization of a substantial yield of dextrose initially, thereafter effecting crystallization of dextrose in said solution and separating the crystallized dextrose therefrom.

9. A method of obtaining dextrose from crystalline dextrose sodium chloride comprising dissolving the dextrose sodium chloride in a water solution containing either no sodium chloride or at least a considerably smaller percentage than is present in the double salt together with dextrose and impurities resulting from the conversion of starch, the addition of dextrose sodium chloride being in a substantial amount but less than 50 parts by weight on a dry substance basis to 50 parts on the same basis of dextrose already present in the solution, evaporating the combined solution and subjecting it to crystallizing operations favorable to the crystallization of dextrose, and separating the crystallized dextrose from the solution.

10. In the manufacture of dextrose, a method of obtaining additional dextrose from a starch conversion solution whose dextrose has previously been partially exhausted comprising adding sodium chloride to said partially exhausted solution in such a proportion relatively to the dextrose present that upon subsequent evaporation and crystallization a yield of crystalline dextrose sodium chloride may be obtained, effecting such evaporation and crystallization, separating the crystallized dextrose sodium chloride from said solution, recovering the dextrose from the double salt by adding the latter to a water solution containing dextrose and impurities resulting from the conversion of starch, the addition of the double salt being proportioned relatively to the dextrose previously present in the solution so that upon suitable concentration and crystallization dextrose only will crystallize, effecting such concentration and crystallization, separating the crystallized dextrose from the solution, and recovering further dextrose from the remaining hydrol by adding sodium chloride thereto in such ratio to the dextrose present that upon suitable concentration and evaporation dextrose sodium chloride will crystallize, effecting such concentration and crystallization, and separating the crystallized double salt from the hydrol.

11. In the manufacture of dextrose from starch conversion liquors, the improvement comprising adding to such liquor whose original dextrose content has been partially exhausted a quantity of sodium chloride in such proportion to the dextrose that upon subsequent crystallization a yield of crystalline dextrose sodium chloride will be obtained, effecting such crystallization and separating the crystallized dextrose sodium chloride from the solution, dissolving the double salt in water to dissociate the dextrose from the sodium chloride, adding the water solution of dextrose sodium chloride to an impure starch conversion liquor in such an amount as to greatly increase the proportion of total dextrose to the uncrystallizable starch conversion substances present but so limiting the amount of the double salt solution so added that the crystalline yield upon subsequent crystallization of the mixture will be dextrose, effecting such last said crystallization, and separating the crystallized dextrose from the mixture.

12. A method of obtaining dextrose from crystalline dextrose sodium chloride comprising dissolving the double salt in water to effect dissociation of the dextrose from the sodium chloride, thereafter adding said water solution to a dextrose solution containing uncrystallizable impurities resulting from the conversion of starch, and regulating the amount of dissociated double salt thus added whereby the ratio of total dextrose in the mixture to the sodium chloride present will cause dextrose only to crystallize upon subsequent crystallization of the mixture, effecting the said crystallization, and separating the crystallized dextrose.

T. HARVIE BARNARD.
PAUL L. STERN.